G. J. HOFFMAN.
COMPOSITE FABRIC.
APPLICATION FILED FEB. 2, 1912.

1,119,697.

Patented Dec. 1, 1914.

Inventor,
George J. Hoffman.
By Victor J. Evans,
Attorney

UNITED STATES PATENT OFFICE.

GEORGE JOSEPH HOFFMAN, OF ROCHESTER, NEW YORK, ASSIGNOR OF ONE-HALF TO ISRAEL GOLDMAN, OF ROCHESTER, NEW YORK.

COMPOSITE FABRIC.

1,119,697.  Specification of Letters Patent.  Patented Dec. 1, 1914.

Application filed February 6, 1912. Serial No. 674,862.

*To all whom it may concern:*

Be it known that I, GEORGE J. HOFFMAN, a citizen of the United States, residing at Rochester, in the county of Monroe and State of New York, have invented new and useful Improvements in Composite Fabric, of which the following is a specification.

This invention relates to a novel composite fabric, the object of the invention being to provide a strong, durable and warm fabric which is impervious to the passage of air or moisture.

The invention consists of the features of construction, combination and arrangement of parts, hereinafter fully described and claimed, reference being had to the accompanying drawing, in which:—

Figure 1:
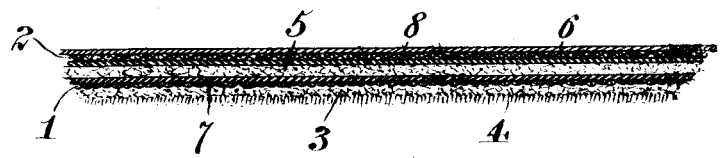
Figure 2:
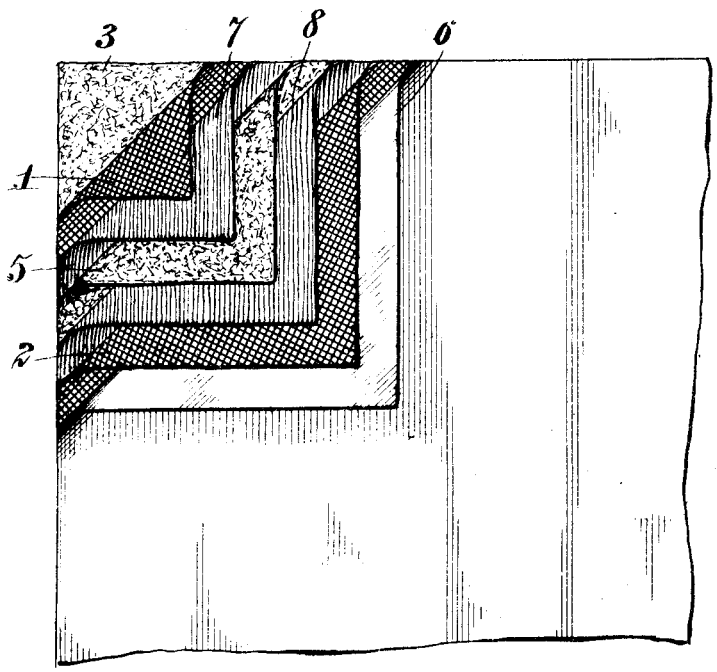

Figure 1 is a sectional view through a piece of fabric made in accordance with the invention. Fig. 2 is a plan view of one side of the fabric, showing the portions of the component parts thereof separated and turned back to show their relationship.

In carrying my invention into practice, I provide a fabric comprising a pair of spaced plies 1 and 2 of loosely knitted or woven material, such as a fine quality of worsted. The outer surface of the inner ply 1 has a lining or backing 3 of felt or other nap material, which in practice is preferably composed of wool, hair and eider-down felted together in any ordinary manner, so that the eider-down will preferably be exposed upon the surface of the felted body, as indicated at 4, to give an ornamental or furry finish.

Between the plies 1 and 2 is arranged an intermediate layer 5, of felt, preferably of the stated composition, with or without the eider-down, as preferred, and secured to the outer side of the ply 2 is a finishing facing 6 of any suitable material and made to give any desired surface appearance to the goods. The facing 6 may consist of a body of fabric saturated with a composition of rubber or other suitable waterproof material, grained, corded or otherwise made or impressed to simulate leather or any other material.

In combining the several elements of the fabric, they are laid in stepped relation with layers 7 and 8 of gum tissue or other fusible cementitious material between the inner fibrous body 5 and the woven or knit layers 1 and 2, and the mass subjected to heat and pressure so as to soften or fuse the gum tissue and force the same into and through the interstices of the fabric plies 1 and 2, so as to combine all of the component parts firmly and securely together and in a practically unitary or homogeneous structure.

Heretofore it has been common to unite layers of cotton, duck or wool or cotton shoddy under heat and compression by the fusion of an intermediate layer of gutta percha, whereby the layers are directly cemented together. Where two layers are thus united the fabric is stiffened to an objectionable extent, and at the same time the bending or flexion of the fabric finally causes the particles of the binder to harden or disintegrate or break up. Therefore, if thin fabric is used, the cementitious material penetrates the same and shows on the exterior and acts to collect particles of dust or dirt. By the use, however, of an intermediate loosely woven or knitted fabric layer, it acts as the carrier for the binder, the interstices of this layer will be filled by the cement which will join firmly all three layers therethrough, obviating the use of a solid coating of cement throughout and thus lending greater flexibility to the fabric as a whole while preventing the binder from breaking or disintegrating under the flexion of the fabric.

A composite fabric is thus produced which is soft and pliable, warm and durable and has a wind and water-proof finish, which fabric may be employed in many ways to take the place of furs, and for many other purposes. If desired, the inner fabric layer and its outer facing may be omitted, when it is desired to produce a thinner fabric.

Having thus described the invention, what I claim as new is:—

1. A composite fabric of the character described comprising a layer of felt, a facing or finishing layer, and an intermediate layer of a loosely woven or knitted fabric between said felt and finishing layers, the said layers being closely compressed together, the intermediate layer having its pores closed by a fused cementitious material, said material coating the surfaces of the said layer and adhering to the inner surfaces of the felt and finishing layers, whereby all three layers are firmly and flexibly bound together.

2. A composite fabric of the character described comprising a composite felt layer composed of a mixture of wool, hair and eiderdown, a finishing layer having an outer coating of a water-proof material, and an intermediate layer of loosely woven or knitted fabric between said felt and finishing layers, said layers being closely compressed together, and said intermediate layer having its pores filled with a fused cementitious material, said material coating the outer faces of the intermediate layer and adhering to the inner faces of the felt and finishing layers, whereby all three layers are firmly and flexibly bound together.

In testimony whereof I affix my signature in presence of two witnesses.

GEORGE JOSEPH HOFFMAN.

Witnesses:
   WILLIAM C. F. KAPELKE,
   Mrs. WILLIAM WARNE.